R. W. DAVID.
TIRE ARMOR.
APPLICATION FILED MAR. 31, 1915.
1,148,504.
Patented Aug. 3, 1915.
2 SHEETS—SHEET 2.
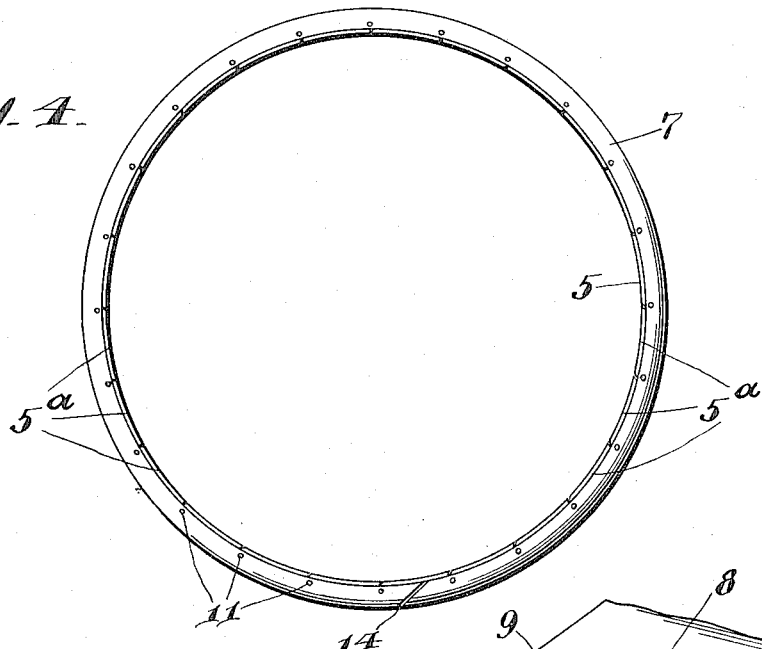
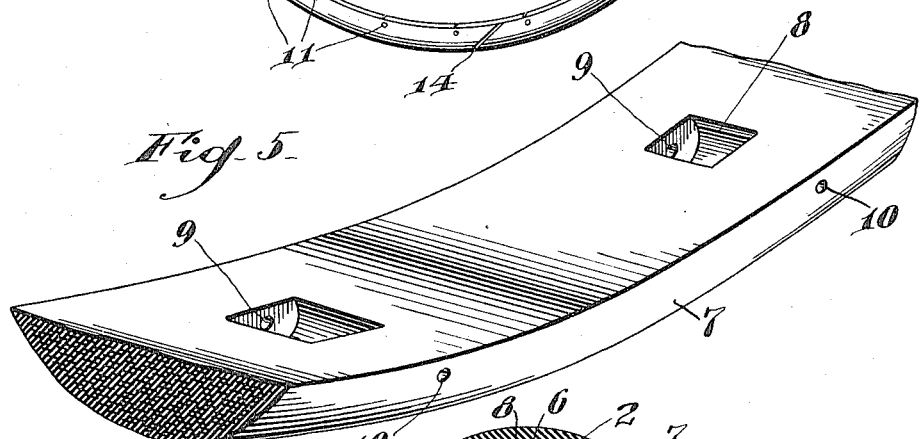
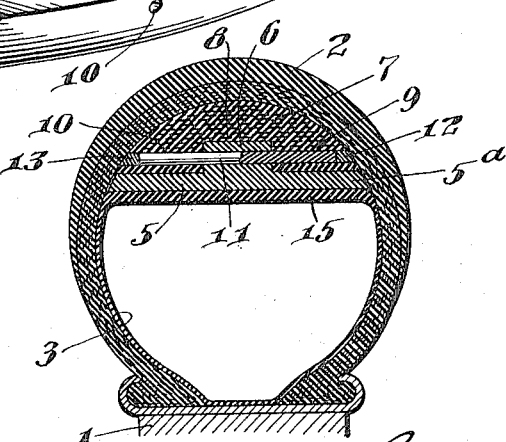

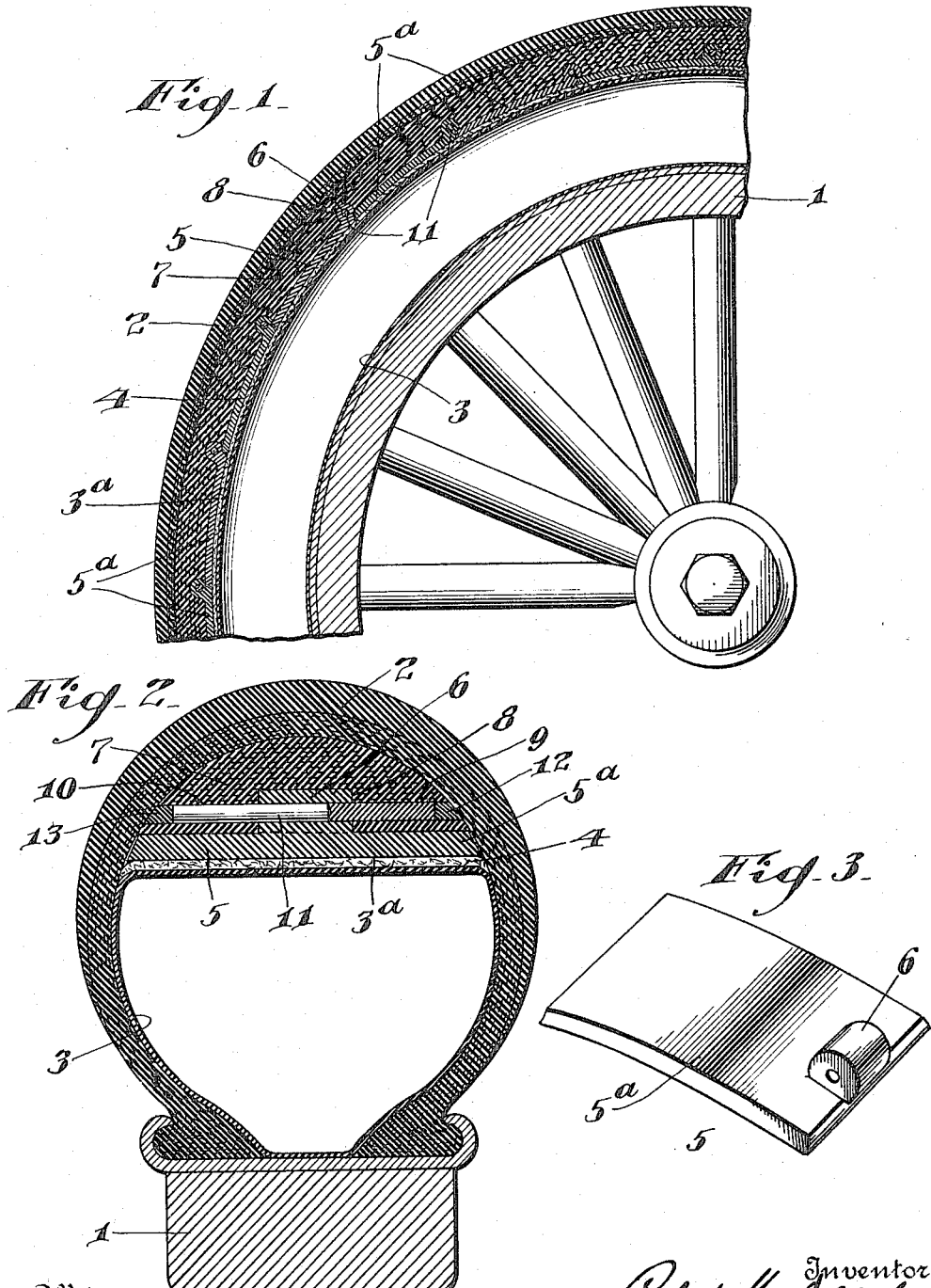

UNITED STATES PATENT OFFICE.

ROBERT W. DAVID, OF PHILADELPHIA, PENNSYLVANIA.

TIRE-ARMOR.

1,148,504.  Specification of Letters Patent.  Patented Aug. 3, 1915.

Application filed March 31, 1915. Serial No. 18,208.

*To all whom it may concern:*

Be it known that I, ROBERT W. DAVID, a citizen of the United States, residing at the city of Philadelphia, in the county of Philadelphia and State of Pennsylvania, have invented certain new and useful Improvements in Tire-Armors, of which the following is a specification.

My invention has relation to the provision of an armored tire; and in such connection it relates to the composition, structure and combined arrangement of such a tire, which renders the same puncture-proof, without sacrifice of the resiliency of such a pneumatic tire.

The principal object of my present invention is to provide a cotton fiber sectional member located between the inner inflated tube and outer shoe of an ordinary pneumatic tire to protect the inner tube from puncture, without sacrifice of flexibility or cushioning effects of the thus formed armored-tire.

A further object of my invention is to provide a tire with a sectional cotton fiber member or the like interposed between the inner inflated tube and outer shoe, one face of said member united with a rubber and canvas cushion located in position next to the shoe, while the opposite face of the said cotton fiber member is in bearing contact with the working face of the inner tube; and a still further object of my invention is to provide the working face of the inner tube with a mat of flexible material located in direct contact with one face of the cotton fiber sectional member and the opposite face of said sectional member with a rubber and canvas cushioning mat, and the said sectional member fits recesses arranged at suitable distances, apart in the said cushioning mat, whereby a protective puncture-proof tire is provided without sacrifice of required resiliency of the thus provided armored-tire; and with these and other objects in view, my said invention consists of certain novel features in the composition, constructive arrangement and combination of parts in the provision of an armored-tire as will be more fully understood from the following description taken in connection with the accompanying drawings forming part hereof, in which—

Figure 1, is a fragmentary view partly in elevation and partly in section, of the tire in its entirety, as shown, embodying essential main features of my said invention. Fig. 2, is a vertical sectional view through the tire. Fig. 3, is a perspective of one of the sections of the armor plate, composed of cotton fiber, showing the preferred formation thereof. Fig. 4, is a side elevational view of the armor unit formed by the combining of the cushioning member therewith, to provide an element which is adapted according to the arrangement of my invention to be quickly introduced between the inner inflated tube and shoe to provide thereby, a puncture proof tire. Fig. 5, is an enlarged perspective fragmentary view of part of the cushioning member; and Fig. 6, is a vertical sectional view through a slightly modified form of the armored tire, showing the working face of the inner inflated tube thickened next to the interposed sectional member in contact therewith.

Referring to the drawings, 1 represents the wheel-rim, 2 the shoe and 3, the inner inflated tube of the tire of the wheel, all of the character generally employed for use, as a pneumatic tire.

4, in Figs. 1 and 2, is a mat of flexible material located as shown, between the working surface $3^a$, of the inner inflated tube 3, and one face of the sectional member 5, of the character and scope of my present invention. This member is composed of cotton fiber made into a series of joining sections $5^a$, each provided with an overhanging perforated and offset lug or projection 6, centrally located in respect to the width of each section.

7, is a rubber and canvas cushioning member with recesses 8, at suitable distances apart therein, for receiving the perforated lugs or projections 6, of the sections of the member 5, as clearly shown in Figs. 1, 3 and 6. The side walls of these recesses are provided with lateral openings 9 and 10, for the insertion of fiber-pins or pintles 11 therethrough, from either side of the cushioning member 7, for holding one end of each of the said sections in position in connection with the said cushioning member 7, so as thereby to provide a unit of the two members, for applying between the inner inflated tube 3 and shoe 2, of the tire. The lateral openings in the cushioning member 7, are provided after the pins or pintles 11 are introduced into the same on both sides, with plugs 12 and 13, to fill out the space to the surface of the tire as clearly illustrated in Figs. 2 and 6. The thus arranged united sections 5 and 7, of the tire can thus be quickly placed next to the inner tube 3 and the shoe 2 readily then applied and the tire brought thereby into a condition for immediate use, without the tire being provided with metal reinforcing means, in the provision of an armored tire to render such puncture-proof. The arrangement of the tire in Fig. 6, is the same as already fully explained, save that instead of the working face of the inner tube 3 being provided with an interposed flexible mat, as in Figs. 1 and 2, the inner tube is made thicker on the working face as at 15, to provide a surface of resiliency between such and the upper face of the sectional member 5.

The united sections 5 and 7, constituting the armoring unit is slipped to place with the two extremities meeting or joining as at 14 for example, in the manner as shown in Fig. 4, and the shoe 2, is then caused to embrace the same to assume the required position, as clearly illustrated in Figs. 1, 2 and 6.

Having thus described the nature and objects of my invention, what I claim as new and desire to secure by Letters Patent is:—

1. An armored tire comprising a member composed of cotton fiber and consisting of sections, each having a perforated lug or projection, a cushioning member having recesses to receive the lugs or projections of said sections and said cushioning member having openings in the side walls thereof, pintles extending through said sections and walls of said cushioning member, an inner inflated tube and a shoe and said armor forming member interposed between said tube and shoe.

2. An armored tire, comprising a member composed of cotton fiber and consisting of sections, each having a perforated lug or projection, a cushioning member having recesses to receive the lugs or projections of said sections and said cushioning member having openings in the side walls thereof, pintles extending through said sections and walls of said cushioning member, an inner inflated tube, a flexible mat arranged next to the working face of said tube and a shoe and said sectional member providing an armor for the tire interposed between said mat and shoe.

3. A tire, comprising an inner inflated tube, a mat of flexible material applied to the face of said tube, a member composed of cotton fiber and consisting of sections having perforated overhanging lugs or projections, a cushioning member provided with recesses at certain distances apart therein, the lugs or projections of said sectional member fitting said recesses, pintles extending through openings in the walls of said cushioning member and the lugs or projections of said sectional members, plugs introduced into the openings and projecting flush with the surface of said cushioning member and a shoe.

4. A tire, comprising an inner tube, a member composed of cotton fiber and consisting of sections each having a perforated lug or projection in one part, a cushioning member provided with recesses to receive the lugs or projections of said sections and said cushioning member having openings in the walls thereof, pintles extending through the walls of said cushioning member and the lugs or projections of said sectional member and a shoe.

5. A tire, comprising an inner tube, a member composed of cotton fiber and consisting of sections, each having a lug or projection in one part, a cushioning member having recesses therein to receive the lugs or projections of said sections and certain of the walls bounding the recesses of said cushioning member having openings extending therethrough, pintles extending through said openings and the lugs or projections of said sectional member and a shoe.

In witness whereof, I have hereunto set my signature in the presence of two subscribing witnesses.

ROBERT W. DAVID.

Witnesses:
THOMAS M. SMITH,
ROSE E. SMITH.

Copies of this patent may be obtained for five cents each, by addressing the "Commissioner of Patents, Washington, D. C."